Patented Dec. 10, 1935

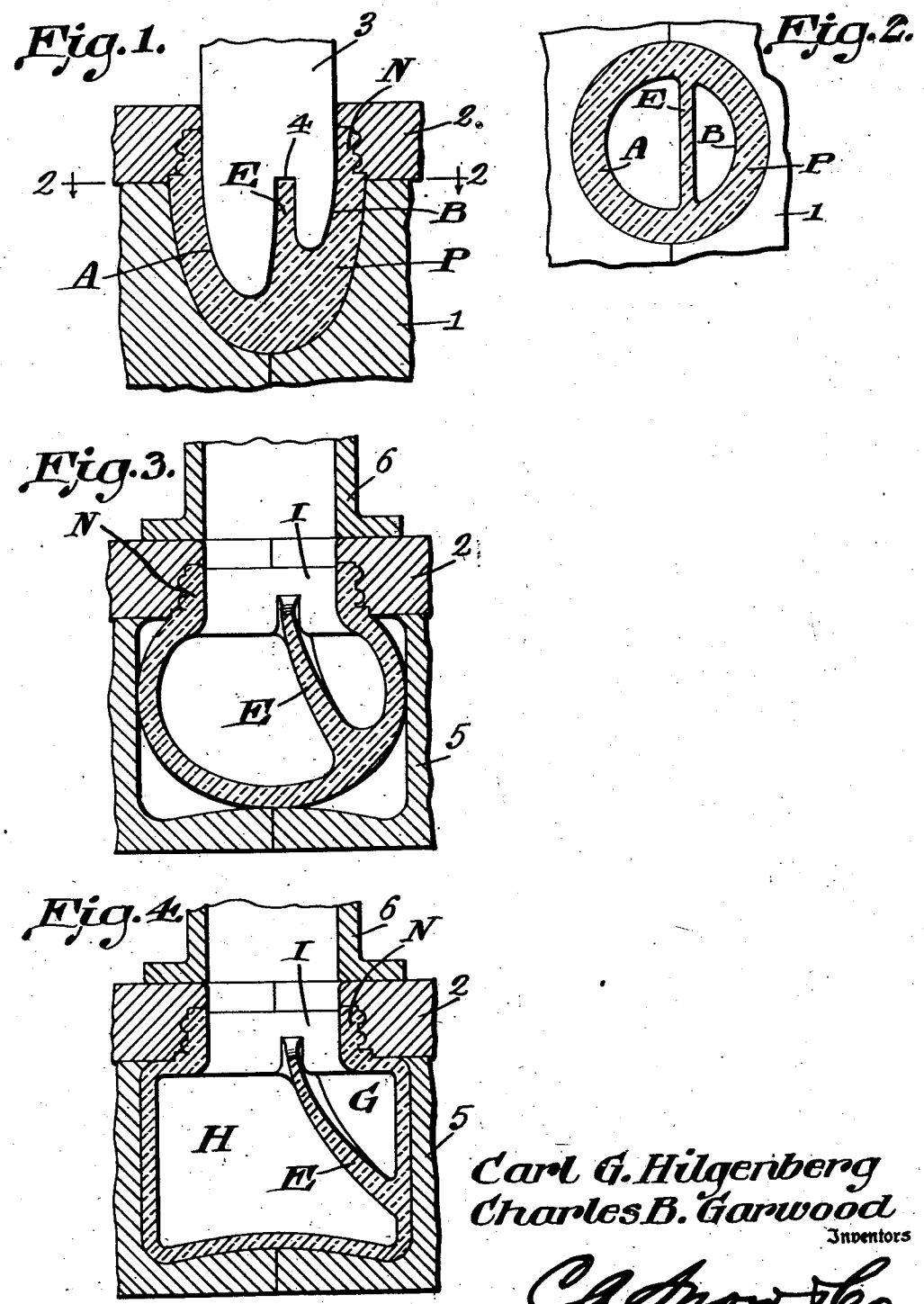

2,023,474

UNITED STATES PATENT OFFICE 2,023,474

METHOD OF MAKING PARTITIONED GLASS CONTAINERS

Carl George Hilgenberg and Charles B. Garwood, Baltimore, Md., assignors to Carr-Lowrey Glass Company, Baltimore, Md.

Application December 27, 1932, Serial No. 649,094

6 Claims. (Cl. 49—80)

This invention relates to a new and improved method of producing glass containers and it is designed primarily for the manufacture of containers having partitions therein which divide the containers into separate compartments.

It is an object of the invention to form the container by subjecting a parison successively to shaping actions whereby recesses are formed initially in a parison and are subsequently enlarged to form compartments the shapes and relative sizes of which are predetermined by the relative volumes of the recesses initially provided.

With the foregoing and other objects in view which will appear as the description proceeds the invention resides in certain novel steps of the method hereinafter more fully described and claimed, it being understood that changes may be made without departing from the spirit of the invention as claimed.

In the accompanying drawing the several steps involved in the method of producing glass containers have been illustrated.

Figure 1 is a section through a parison and its mold while subjected to pressure of a shaping plunger.

Figure 2 is a section on line 2—2 Figure 1, the plunger being withdrawn from the pressed parison.

Figure 3 is a section showing the parison partly blown in a finishing mold, this view illustrating how the partition provided between the recesses initially formed by the plunger can be distorted.

Figure 4 is a view similar to Figure 3 showing the finished article in section within its mold following the completion of the blowing operation.

In carrying out the method constituting the present invention the metal gather or blank P is deposited in a parison mold 1 with a portion surrounded by a neck ring 2. A neck pin or plunger 3 is used to shape the confined parison so as to produce a parison with a desired neck finish N and with spaced recesses A and B. In Figure 1 the recesses A and B have been shown of different volumes, recess B being of less depth and area than recess A. While the recesses in the figures are of certain predetermined volumes it is to be understood that their relative sizes can be changed to meet the requirements. In any case the plunger is formed with a slot 4 extending across the active end thereof so that when the parison is shaped by the pin or plunger 3 partition E will be extended from one side to the other of the parison and serve to separate the recesses A and B.

Following the shaping of the parison it is conveyed by the neck ring to a finish or blow mold 5 and is then subjected to the action of air under pressure supplied through a blow-head 6. As the air enters the recesses A and B, for example, the parison will be expanded. The wall area of recess B is less than the wall area of recess A. Consequently the action of the air will be such as to cause the partition E to be drawn downwardly and laterally in Figure 3 until the excess metal of the parison has been spread over the inner surface of the finishing mold and the article brought to its final shape, as shown in Figure 4.

By varying the relative volumes of the recesses A and B the ultimate proportions and shape of the partition E can be varied correspondingly. For example, by making the recess B smaller than illustrated the resultant partition would be curved downwardly and laterally more abruptly than has been shown with the result that the smaller or supplemental compartment G produced from recess B will be further reduced in size relative to the larger or main compartment H over which the partition overlies. In any case, however, both compartments open into the neck opening I of the finished container so that an object, such as a pen, can be introduced into either compartment.

In every case the relative sizes of the compartments are pre-determined by the relative volumes of the recesses initially produced and in every case the relative shapes of the compartments are dependent upon the relative sizes and volumes of the initially produced recesses.

What is claimed is:

1. The method of producing a glass container with separate overlying compartments having a common inlet, which includes the steps of forming a parison with separate recesses of different depths with a partition therebetween, and subsequently blowing the parison in a finishing mold.

2. The method of producing a partitioned glass container which includes the steps of forming recesses of different areas in a parison and subsequently blowing the parison to enlarge the recesses into different shapes respectively predetermined by the wall areas of the respective recesses.

3. The method of producing a partitioned glass container which includes the steps of forming recesses of different volumes in a parison and subsequently blowing the parison to enlarge the recesses into different shapes respectively predetermined by the relative volumes of the recesses, the shaped recesses being disposed in partly superposed relation and provided with a common inlet.

4. The method of producing a partitioned glass container having compartments one of which is disposed above the bottom of the other, both compartments having a common inlet, which includes the steps of forming recesses of different depths in a parison and subsequently blowing the parison to enlarge the recesses into shapes predetermined by the relative transverse areas and depths of the recesses.

5. The method of producing a glass container with a main compartment and a smaller overlying supplemental compartment both having a common inlet, which includes the step of forming a parison with separate recesses of different transverse areas and different depths to form a partition between the recesses, and subsequently blowing the parison to expand the recesses and displace the material of the parison to draw the partition to position beneath one recess and above a portion of the other recess.

6. The method of forming a glass receptacle which includes the step of forming separate recesses in a parison separated by a partition, said recesses being of different depths, the bulk of glass beneath the smaller recess and adjacent to the inner end of the partition being greater than at other points, and thereafter directing air under pressure into the two recesses simultaneously thereby to expand the recesses in proportion to their sizes and distribute the surplus glass from the point of greatest bulk to draw the inner portion of the partition therewith to a laterally extended position where it will be spaced from but overlie the bottom of the larger recess and form the bottom of the smaller recess.

CARL GEORGE HILGENBERG.
CHARLES B. GARWOOD.